United States Patent
Jung et al.

(10) Patent No.: US 11,978,594 B2
(45) Date of Patent: *May 7, 2024

(54) MULTI-LAYER CERAMIC ELECTRONIC COMPONENT

(71) Applicant: SAMSUNG ELECTRO-MECHANICS CO., LTD., Suwon-si (KR)

(72) Inventors: In Kyung Jung, Suwon-si (KR); Dong Hwi Shin, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/135,324

(22) Filed: Apr. 17, 2023

(65) Prior Publication Data
US 2023/0253159 A1     Aug. 10, 2023

Related U.S. Application Data

(63) Continuation of application No. 17/702,230, filed on Mar. 23, 2022, now Pat. No. 11,657,975, which is a
(Continued)

(30) Foreign Application Priority Data

Sep. 2, 2019    (KR) .................. 10-2019-0108008

(51) Int. Cl.
*H01G 4/232*    (2006.01)
*H01G 4/30*     (2006.01)

(52) U.S. Cl.
CPC ............. *H01G 4/2325* (2013.01); *H01G 4/30* (2013.01)

(58) Field of Classification Search
None
See application file for complete search history.

(56) References Cited

U.S. PATENT DOCUMENTS 9,190,207 B2 *   11/2015  Hong ...................... H01G 4/30
9,875,849 B2      1/2018  Lee et al.
(Continued)

FOREIGN PATENT DOCUMENTS

CN     106206010 A     12/2016
CN     109461578 A      3/2019
(Continued)

OTHER PUBLICATIONS

Office Action issued in corresponding Chinese Patent Application No. 202010268793.0 dated Sep. 30, 2021, with English translation.
(Continued)

*Primary Examiner* — Dion R. Ferguson
(74) *Attorney, Agent, or Firm* — MORGAN, LEWIS & BOCKIUS LLP (57) ABSTRACT

A multilayer ceramic electronic component includes a ceramic body, and first and second external electrodes disposed on the surface of the ceramic body, respectively. The ceramic body includes a capacitance forming portion including a dielectric layer and internal electrodes, margin portions disposed on both sides of the capacitance forming portion, and cover portions disposed on both sides of the capacitance forming portion. The first and second external electrodes include first and second base electrodes, respectively, first and second conductive layers disposed on edges of the first and second base electrodes, respectively, and first and second terminal electrodes covering the first and second base electrodes, respectively.

10 Claims, 8 Drawing Sheets

Related U.S. Application Data continuation of application No. 16/784,461, filed on Feb. 7, 2020, now Pat. No. 11,315,732.

(56) References Cited

U.S. PATENT DOCUMENTS

| | | | |
|---|---|---|---|
| 9,892,855 B2* | 2/2018 | Ando | H01G 4/248 |
| 10,453,612 B2* | 10/2019 | Terashita | H01G 4/248 |
| 10,861,651 B2* | 12/2020 | Lee | H01G 4/12 |
| 11,315,732 B2* | 4/2022 | Jung | H01G 4/2325 |
| 11,657,975 B2* | 5/2023 | Jung | H01G 4/30 361/306.3 |
| 2008/0118721 A1 | 5/2008 | Horie et al. | |
| 2015/0162132 A1* | 6/2015 | Kwag | H01G 4/2325 361/301.4 |
| 2015/0243439 A1* | 8/2015 | Kwag | H05K 1/181 361/301.4 |
| 2016/0276104 A1* | 9/2016 | Nishisaka | H01G 4/2325 |
| 2016/0351332 A1* | 12/2016 | Lee | H01G 4/232 |
| 2017/0098505 A1* | 4/2017 | Ando | H01G 4/232 |
| 2018/0174753 A1* | 6/2018 | Terashita | H01G 4/008 |
| 2019/0066923 A1* | 2/2019 | Jung | H01G 4/008 |
| 2019/0164696 A1* | 5/2019 | Onodera | H01G 4/008 |
| 2021/0065980 A1* | 3/2021 | Jung | H01G 4/232 |
| 2021/0065982 A1* | 3/2021 | Jung | H01G 4/2325 |

FOREIGN PATENT DOCUMENTS

| | | |
|---|---|---|
| JP | 2003-197460 A | 7/2003 |
| JP | 2018-101724 A | 6/2018 |
| JP | 2019-102515 A | 6/2019 |
| KR | 10-2008-0019053 A | 2/2008 |
| KR | 10-2015-0065467 A | 6/2015 |
| KR | 10-2016-0139932 A | 12/2016 |

OTHER PUBLICATIONS

Notice of Allowance issued in corresponding U.S. Appl. No. 16/781,461 dated Feb. 14, 2022.
Final Office Action issued in corresponding U.S. Appl. No. 16/781,461 dated Oct. 20, 2021.
Office Action issued in corresponding U.S. Appl. No. 16/781,461 dated May 26, 2021.
Notice of Allowance issued in corresponding U.S. Appl. No. 17/702,230 dated Jan. 19, 2023.
Office Action issued in corresponding U.S. Appl. No. 17/702,230 dated Sep. 27, 2022.
Office Action issued in corresponding Korean Patent Application No. 10-2019-0108008 dated Mar. 20, 2020, with English translation.

* cited by examiner

MULTI-LAYER CERAMIC ELECTRONIC COMPONENT

CROSS-REFERENCE TO RELATED APPLICATION(S)

This application is the continuation application of U.S. patent application Ser. No. 17/702,230 filed on Mar. 23, 2022, which is the continuation application of U.S. patent application Ser. No. 16/784,461 filed on Feb. 7, 2020, now U.S. Pat. No. 11,315,732 issued on Apr. 26, 2022, which claims benefit of priority to Korean Patent Application No. 10-2019-0108008 filed on Sep. 2, 2019 in the Korean Intellectual Property Office, the disclosures of which are incorporated herein by reference in their entirety.

TECHNICAL FIELD

The present disclosure relates to a multilayer ceramic electronic component.

BACKGROUND

Recently, with the trend for miniaturization of electronic products, multilayer ceramic electronic components are also required to be miniaturized and to have high capacity.

In accordance with the demand for miniaturization and high capacity of multilayer ceramic electronic components, external electrodes of a multilayer ceramic electronic component are also becoming thinner.

According to the related art, to form the external electrode, glass, a base resin, and an organic solvent are mixed with a conventional conductive metal to manufacture an external electrode paste, the external electrode paste is applied to both end surfaces of a ceramic main body, and then the ceramic main body is sintered to sinter a metal inside the external electrode.

The external electrode paste uses a conductive metal as a main material to ensure chip sealing and electrical connection with the chip, and uses glass as an auxiliary material to fill an empty space when the metal is sintered and shrunk while providing binding force between an external electrode and a chip.

However, as the multilayer ceramic electronic component has been miniaturized and has high capacity, the stacking number of internal electrodes is increased to secure capacity, so the design to reduce a thickness of upper and lower cover layers is universally applied.

Accordingly, when an external electrode is formed, an internal electrode is formed in the vicinity of a corner portion of a ceramic body, having a reduced thickness, and thus may be easily exposed to physical and chemical impacts.

In detail, as an external electrode of the multilayer ceramic electronic component is thinned, a thickness of an external electrode near a corner portion of a ceramic main body is further reduced, so corner coverage performance may be lowered and a plating solution may be penetrated.

Moreover, in the case of an external electrode used in a high capacity model, when an external electrode is sintered, in order to reduce thermal shock, a material which can be sintered at low temperature is used. In detail, in the case of glass which is softened at a low temperature, the glass may have relatively weak acid resistance properties during plating. Due to the properties described above, when a plating layer is formed outside of an external electrode, a plating solution may easily penetrate thereinto, which may mainly cause degradation of a product quality caused by degradation of moisture resistance reliability.

SUMMARY

An aspect of the present disclosure is to provide a multilayer ceramic electronic component capable of improving corner coverage performance of an external electrode to block a moisture penetration path so as to improve moisture resistance reliability, and allowing a band portion of the external electrode to be formed to be thin.

According to an aspect of the present disclosure, a multilayer ceramic electronic component includes a ceramic body; and first and second external electrodes disposed on the fifth surface and the sixth surface of the ceramic body, respectively. The ceramic body includes a capacitance forming portion including a dielectric layer and first and second internal electrodes disposed with the dielectric layer interposed therebetween to be stacked in a third direction, margin portions disposed on both sides of the capacitance forming portion in a second direction, and cover portions disposed on both sides of the capacitance forming portion in the third direction. The ceramic body has fifth and sixth surfaces opposing in a first direction, third and fourth surfaces opposing in the second direction, first and second surfaces opposing in the third direction. The first and second external electrodes include first and second base electrodes disposed on the fifth surface and the sixth surface of the ceramic body, respectively, first and second conductive layers disposed on edges of the first and second base electrodes, respectively, and first and second terminal electrodes covering the first and second base electrodes and the first and second conductive layers, respectively. A ratio $A_1/A_2$ of an area $A_1$ of the first conductive layer or the second conductive layer, disposed on the first base electrode or the second base electrode and corresponding to a cross-section of the ceramic body in the second direction and the third direction, to an area $A_2$ of the end surface of the ceramic body parallel to the second direction and the third direction, is within a range of 0.1 to 0.3.

According to another aspect of the present disclosure, a multilayer ceramic electronic component includes a ceramic body having fifth and sixth surfaces opposing each other in a first direction, third and fourth surfaces opposing each other in a second direction, first and second surfaces opposing each other in a third direction, and including: a capacitance forming portion including a dielectric layer and first and second internal electrodes disposed with the dielectric layer interposed therebetween to be stacked in the third direction, margin portions disposed on both sides of the capacitance forming portion in the second direction, and cover portions disposed on both sides of the capacitance forming portion in the third direction; and first and second external electrodes disposed on the fifth surface and the sixth surface of the ceramic body, respectively. The first and second external electrodes include first and second base electrodes disposed on the fifth surface and the sixth surface of the ceramic body, respectively, first and second conductive layers disposed on edges of the first and second base electrodes, respectively, and first and second terminal electrodes covering the first and second base electrodes and the first and second conductive layers, respectively. The first conductive layer has an opening exposing a portion of the first base electrode disposed on the fifth surface, and covers a portion of the capacitance forming portion in the first direction and edges of the ceramic body where the fifth surface meets the first to fourth surface. The second conductive layer has an opening exposing a portion of the second base electrode disposed on the sixth surface, and covers another portion of the capacitance forming portion in the first direction and edges of the ceramic body where the sixth surface meets the first to fourth surface. End portions of extending portions of the first base electrode and the second base electrode, disposed on the first to fourth surfaces and facing each other in the first direction, are exposed from the first conductive layer and the second conductive layer, respectively.

Other features and aspects will be apparent from the following detailed description, the drawings, and the claims.

BRIEF DESCRIPTION OF DRAWINGS

The above and other aspects, features, and advantages of the present disclosure will be more clearly understood from the following detailed description taken in conjunction with the accompanying drawings, in which.

DETAILED DESCRIPTION

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

Throughout the specification, it will be understood that when an element, such as a layer, region or wafer (substrate), is referred to as being "on," "connected to," or "coupled to" another element, it can be directly "on," "connected to," or "coupled to" the other element or other elements intervening therebetween may be present. In contrast, when an element is referred to as being "directly on," "directly connected to," or "directly coupled to" another element, there may be no elements or layers intervening therebetween. Like numerals refer to like elements throughout. As used herein, the term "and/or" includes any and all combinations of one or more of the associated listed items.

It will be apparent that though the terms first, second, third, etc. may be used herein to describe various members, components, regions, layers and/or sections, these members, components, regions, layers and/or sections should not be limited by these terms. These terms are only used to distinguish one member, component, region, layer or section from another region, layer or section. Thus, a first member, component, region, layer or section discussed below could be termed a second member, component, region, layer or section without departing from the teachings of the exemplary embodiments.

Spatially relative terms, such as "above," "upper," "below," and "lower" and the like, may be used herein for ease of description to describe one element's relationship to another element(s) as shown in the figures. It will be understood that the spatially relative terms are intended to encompass different orientations of the device in use or operation in addition to the orientation depicted in the figures. For example, if the device in the figures is turned over, elements described as "above," or "upper" other elements would then be oriented "below," or "lower" the other elements or features. Thus, the term "above" can encompass both the above and below orientations depending on a particular direction of the figures. The device may be otherwise oriented (rotated 90 degrees or at other orientations) and the spatially relative descriptors used herein may be interpreted accordingly.

The terminology used herein describes particular embodiments only, and the present disclosure is not limited thereby. As used herein, the singular forms "a," "an," and "the" are intended to include the plural forms as well, unless the context clearly indicates otherwise. It will be further understood that the terms "comprises," and/or "comprising" when used in this specification, specify the presence of stated features, integers, steps, operations, members, elements, and/or groups thereof, but do not preclude the presence or addition of one or more other features, integers, steps, operations, members, elements, and/or groups thereof.

Hereinafter, embodiments of the present disclosure will be described with reference to schematic views illustrating embodiments of the present disclosure. In the drawings, for example, due to manufacturing techniques and/or tolerances, modifications of the shape shown may be estimated. Thus, embodiments of the present disclosure should not be construed as being limited to the particular shapes of regions shown herein, for example, to include a change in shape results in manufacturing. The following embodiments may also be constituted by one or a combination thereof.

The contents of the present disclosure described below may have a variety of configurations and propose only a required configuration herein, but are not limited thereto.

In the drawings, the X direction may be defined as a first direction, an L direction, or a longitudinal direction, the Y direction may be defined as a second direction, a W direction, or a width direction, and the Z direction may be defined as a third direction, a T direction, or a thickness direction.

Here, referring to FIGS. 1 to 5, a multilayer ceramic electronic component according to an embodiment of the present disclosure will be described in detail.

Referring to FIGS. 1 to 5, a multilayer ceramic electronic component according to an embodiment of the present disclosure includes: a ceramic body 110; and first and second external electrodes 131 and 132 disposed on a fifth surface S5 and a sixth surface S6 of the ceramic body 110, respectively. Moreover, the ceramic body includes capacitance forming portions $\alpha_W$ and $\alpha_T$ including a dielectric layer 111 and first and second internal electrodes 121 and 122 disposed with the dielectric layer 111 interposed therebetween and stacked in the third direction (the Z direction), margin portions d disposed on both sides of the capacitance forming portion $\alpha_W$ and $\alpha_T$ in the second direction (the Y direction), and cover portions c disposed on both sides of the capacitance forming portions $\alpha_W$ and $\alpha_T$ in the third direction (the Z direction), and includes the fifth and sixth surfaces S5 and S6 opposing in the first direction (the X direction), the third and fourth surfaces S3 and S4 opposing in the second direction (the Y direction), and the first and second surfaces S1 and S2 opposing in the third direction (the Z direction). The first and second external electrodes 131 and 132 include first and second base electrodes 131a and 132a disposed on the fifth surface S5 and the sixth surface S6 of the ceramic body 110, respectively, first and second conductive layers 131b and 132b disposed on edges of the first and second base electrodes 131a and 132a, respectively, and first and second terminal electrodes 131c and 132c covering the first and second base electrodes 131a and 132a as well as the first and second conductive layers 131b and 132b, respectively.

When the first and second conductive layers 131b and 132b are disposed on edge portions of the ceramic body 110, the first and second conductive layers 131b and 132b may serve to protect internal electrodes from an outside.

For miniaturization, large capacity, and formation of capacity of a multilayer ceramic electronic component, a structure for increasing the stacking number of internal electrodes and reducing a thickness of a cover portion may be applied. In this case, when an external electrode is formed, an internal electrode is formed in the vicinity of an edge of a ceramic body, having a reduced thickness, and thus may be easily exposed to physical and chemical impact.

In detail, as an external electrode of the multilayer ceramic electronic component is thinned, a thickness of an external electrode near an edge portion of a ceramic body is further reduced, so corner coverage performance may be lowered and a plating solution may be penetrated. Moreover, when glass is applied to the external electrode, the external electrode may have relatively weak acid resistance properties during plating. Due to the properties described above, when a plating layer is formed on an external electrode, a plating solution is easily penetrated thereinto, which may cause degradation of a product quality caused by degradation of moisture resistance reliability. In the multilayer ceramic electronic component according to an embodiment of the present disclosure, the first and second conductive layers 131a and 132a are disposed on edges of a ceramic body, respectively, so degradation of moisture resistance reliability, caused by plating solution penetration and/or moisture penetration, may be prevented.

According to an embodiment of the present disclosure, a ratio $A_1/A_2$ of an area $A_1$ of the first conductive layer 131b or the second conductive layer 132b, disposed on the first base electrode 131a or the second base electrode 132a and corresponding to an end surface of the ceramic body 110 parallel to the second direction (the Y direction) and the third direction (the Z direction), to an area $A_2$ of an end surface of the ceramic body 110 parallel to the second direction (the Y direction) and the third direction (the Z direction), may satisfy the range of 0.1 to 0.3. That is, a portion of the first base electrode 131a, for example, a central portion, disposed on the fifth surface S5 may be exposed from the first conductive layer 131b by an opening in the first conductive layer 131b, and a portion of the second base electrode 132a, for example, a central portion, disposed on the sixth surface S6 may be exposed from the second conductive layer 132b by an opening in the second conductive layer 132b.

The area $A_2$ of the end surface of the ceramic body 110 in the second direction (the Y direction) and the third direction (the Z direction) may be a value obtained by multiplying a width and a thickness of the ceramic body 110, for example, a value calculated as $(d+\alpha_W+d)\times(c+\alpha_T+c)$. Moreover, an area $A_1$ of the first conductive layer 131b or the second conductive layer 132b corresponding to an end surface of the ceramic body 110 parallel to the second direction (the Y direction) and the third direction (the Z direction) may refer to an area, covering the fifth surface S5 or the sixth surface S6 of the ceramic body 110, of the first conductive layer 131b or the second conductive layer 132b disposed on the first base electrode 131a or the second base electrode 132a. That is, an area $A_1$ of the first conductive layer 131b or the second conductive layer 132b corresponding to an end surface of the ceramic body 110 parallel to the second direction (the Y direction) and the third direction (the Z direction) may refer to an area of the first conductive layer 131b or the second conductive layer 132b disposed on an end surface of the ceramic body 110 parallel to the second direction (the Y direction) and the third direction (the Z direction).

In the multilayer ceramic electronic component 100 according to an embodiment of the present disclosure, a ratio $A_1/A_2$ of an area $A_1$ of the first conductive layer 131b or the second conductive layer 132b, corresponding to an end surface of the ceramic body 110 parallel to the second direction (the Y direction) and the third direction (the Z direction), to an area $A_2$ of an end surface of the ceramic body 110 parallel to the second direction (the Y direction) and the third direction (the Z direction), may satisfy the range described above, so excellent corner coverage characteristics may be obtained.

In an embodiment of the present disclosure, the ceramic body 110 may include capacitance forming portions $\alpha_W$ and $\alpha_T$ including a dielectric layer 111, as well as first and second internal electrodes 121 and 122, margin portions d disposed on both sides of the capacitance forming portions $\alpha_W$ and $\alpha_T$ in the second direction (the Y direction), and cover portions c disposed on both sides of the capacitance forming portions $\alpha_W$ and $\alpha_T$ in the third direction (the Z direction).

A shape of the ceramic body 110 is not particularly limited, but may be a hexahedral shape or a shape similar to a hexahedral shape, as illustrated in the drawings. Although the ceramic body 110 does not have a hexahedral shape having perfectly straight lines due to shrinkage of ceramic powders included in the ceramic body 110 in a sintering process, the ceramic body 110 may have substantially the hexahedral shape. The ceramic body 110 may have first and second surfaces S1 and S2 opposing each other in the thickness direction (the Z direction), third and fourth surfaces S3 and S4 connected to the first and second surfaces S1 and S2 and opposing each other in the width direction (the Y direction), and fifth and sixth surfaces S5 and S6 connected to the first and second surfaces S1 and S2, connected to the third and fourth surfaces S3 and S4, and opposing each other in the length direction (the X direction).

The ceramic body 110 may be formed by alternately stacking a ceramic green sheet in which a first internal electrode 121 is printed on a dielectric layer 111 and a ceramic green sheet in which a second internal electrode 122 is printed on a dielectric layer 111 in a thickness direction (the Z direction).

The capacitance forming portions $\alpha_W$ and $\alpha_T$ may include a dielectric layer 111 and internal electrodes 121 and 122 alternately stacked in the third direction. The plurality of dielectric layers 111, forming the capacitance forming portions $\alpha_W$ and $\alpha_T$, may be in a sintered state, and adjacent dielectric layers 111 may be integrated with each other so that boundaries therebetween are not readily apparent without using a scanning electron microscope (SEM).

According to an embodiment of the present disclosure, a raw material of the dielectric layer 111 is not particularly limited as long as sufficient capacitance may be obtained therewith. For example, the raw material of the dielectric layer 111 may be a barium titanate material, a lead composite perovskite-type material, or a strontium titanate material Moreover, a material of the dielectric layer 111 may be prepared by adding various ceramic additives, organic solvents, plasticizers, binders, dispersing agents, and the like, to powders such as barium titanate ($BaTiO_3$) powders, or the like, according to an object of the present disclosure.

For example, the dielectric layer 111 may be formed by applying and drying slurry including a powder such as a barium titanate ($BaTiO_3$) powder, or the like, on a carrier film, to prepare a plurality of ceramic sheets. The ceramic sheet may be formed by mixing a ceramic powder, a binder, and a solvent to prepare slurry, and forming the slurry into a sheet having a thickness of several μm using a doctor blade method, but the present disclosure is not limited thereto.

In the multilayer ceramic electronic component 100 according to an embodiment of the present disclosure, a plurality of internal electrodes 121 and 122 are disposed to oppose each other with a dielectric layer 111 interposed therebetween. The internal electrodes 121 and 122 may include first and second internal electrodes 121 and 122 alternately disposed to oppose each other with a dielectric layer 111 interposed therebetween.

The first internal electrode 121 may be exposed to one side of the ceramic body 110 in the first direction (the X direction), and a portion of the first internal electrode, exposed to one side in the first direction (the X direction), may be connected to the first external electrode 131. The second internal electrode 122 may be exposed to the other side of the ceramic body 110 in the first direction (the X direction), and a portion of the second internal electrode, exposed to the other side in the first direction (the X direction), may be connected to the second external electrode 132. The first and second internal electrodes 121 and 122 may be electrically isolated from each other by the dielectric layers 111 interposed therebetween.

Here, a material, forming the first and second internal electrodes 121 and 122, is not particularly limited. For example, the first and second internal electrodes 121 and 122 may be formed using a conductive paste containing at least one among silver (Ag), gold (Au), platinum (Pt), nickel (Ni), copper (Cu), tin (Sn), tungsten (W), palladium (Pd), titanium (Ti), and an alloy thereof. A method of printing the conductive paste such as screen printing or gravure printing may be used, but an embodiment of the present disclosure is not limited thereto.

In the multilayer ceramic electronic component 100 according to an embodiment of the present disclosure, margin portions d may be disposed on both sides of the capacitance forming portions $\alpha_W$ and $\alpha_T$ in the second direction (the Y direction). The margin portions d may be disposed on both sides of the capacitance forming portions $\alpha_W$ and $\alpha_T$ in the second direction (the Y direction), perpendicular to the first and third directions (the X direction and the Z direction). The margin portions d may serve to prevent damage to the internal electrode due to physical or chemical stress.

The margin portions d may be formed of an insulating material, and may be formed of a ceramic material such as barium titanate. In this case, the margin portions d may include a ceramic material the same as that included in the dielectric layer 111, or may be formed of a material the same as the dielectric layer 111.

A method of forming the margin portions d is not particularly limited. For example, an area of dielectric layers included in the capacitance forming portions $\alpha_W$ and $\alpha_T$ is greater than an area of an internal electrode, and a margin region is formed in a remaining circumferential portion except a portion of an internal electrode connected to an external electrode, slurry including ceramic is applied thereto, or dielectric sheets are attached to both sides of a capacitance forming portion in the second direction (the Y direction) so as to form the margin portions.

The multilayer ceramic electronic component 100 according to an embodiment of the present disclosure may include cover portions c. The cover portions c may be disposed at outermost portions of the first and second internal electrodes 121 and 122. The cover portions may be disposed in a lower portion of an internal electrode in a lowermost portion of the ceramic body 110 and an upper portion of an internal electrode in an uppermost portion. In this case, the cover portion may be formed of a composition the same as the dielectric layer 111, and may be formed by stacking at least one dielectric layer not including an internal electrode in each of an upper portion of an internal electrode in an uppermost portion of the ceramic body 110 and a lower portion of an internal electrode in a lowermost portion. The cover portions c may basically serve to prevent damage to the internal electrode due to physical or chemical stress.

In the multilayer ceramic electronic component 100 according to an embodiment of the present disclosure, the first external electrode 131 and the second external electrode 132 may be disposed on both sides of the ceramic body in the first direction (the X direction). The first external electrode 131 is electrically connected to the first internal electrode 121, while the second external electrode 132 is electrically connected to the second internal electrode 122.

Figure 4:
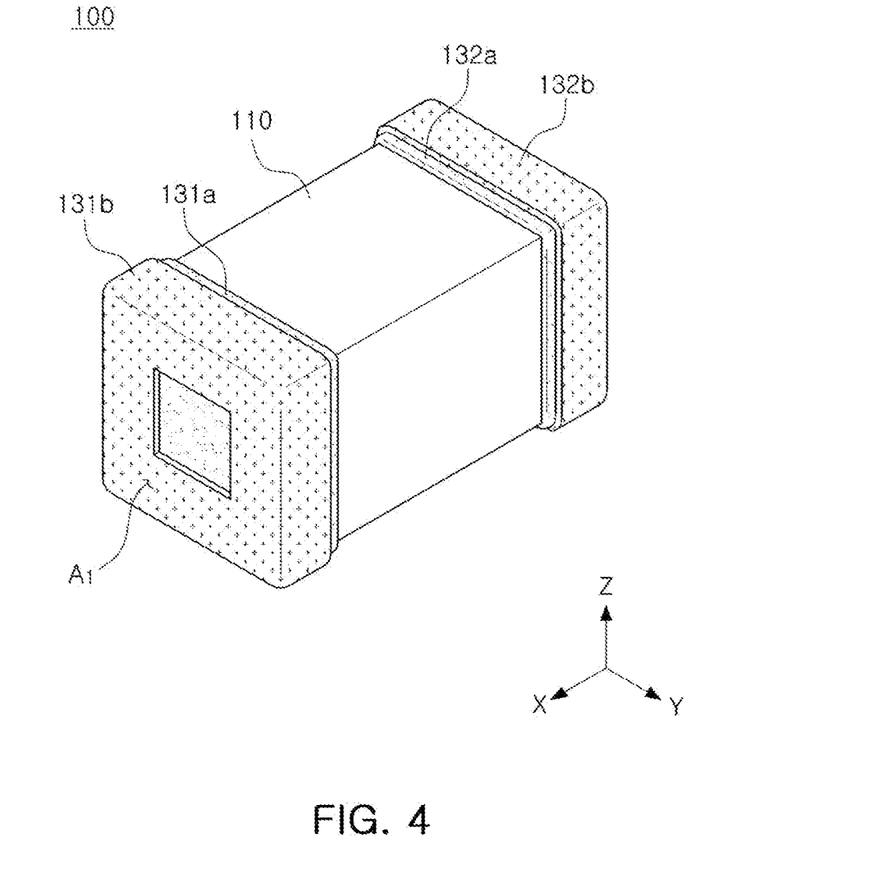
FIG. 4 is a schematic perspective view illustrating a structure of arrangement of a conductive layer on a base electrode of the multilayer ceramic electronic component of FIG. 3.

The first and second external electrodes 131 and 132 may include first and second base electrodes 131a and 132a disposed on both sides of the ceramic body 110 in the first direction (the X direction) and first and second conductive layers 131b and 132b disposed on edges of the first and second base electrodes 131a and 132a, respectively. FIG. 4 is a schematic perspective view illustrating a structure in which first and second base electrodes 131a and 132a as well as first and second conductive layers 131b and 132b are only disposed in the ceramic body 110. Referring to FIG. 4, the first base electrode 131a covers the fifth surface S5 of the ceramic body 110, and the first conductive layer 131b may be disposed on the fifth surface S5 of the ceramic body 110, on which the first base electrode 131a is disposed, and an edge at which the first to fifth surfaces S1 to S5 meet. Moreover, the second base electrode 132a covers the sixth surface S6 of the ceramic body 110, and the second conductive layer 132b may be disposed on the sixth surface S6 of the ceramic body 110, on which the second base electrode 132a is disposed, and an edge at which the first to fourth surfaces S1 to S4 and the sixth surface S6 meet.

In an embodiment of the present disclosure, the first conductive layer 131b may extend and be disposed on a first base electrode 131a disposed on the fifth surface S5 of the ceramic body 110 and an extending portion, such as a band portion, of the first base electrode 131a extending on the first to fourth surfaces S1 to S4 in contact with the fifth surface S5, while the second conductive layer 132b may extend and be disposed on a second base electrode 132a disposed on the sixth surface S6 of the ceramic body 110 and an extending portion, such as a band portion, of a second base electrode 132a extending on the first to fourth surfaces S1 to S4 in contact with the sixth surface S6. Referring to FIG. 4, the first conductive layer 131b may extend and disposed on a first base electrode 131a disposed on the fifth surface S5 of the ceramic body 110 and an extending portion, such as a band portion, of the first base electrode 131a extending on the first to fourth surfaces S1 to S4 of the ceramic body 110, while the second conductive layer 132b may extend and disposed on a second base electrode 132a disposed on the sixth surface S6 of the ceramic body 110 and an extending portion, such as a band portion, of the second base electrode 132a extending on the first to fourth surfaces S1 to S4 of the ceramic body 110. In one example, end portions of the extending portions (e.g., end portions of the band portions) of the first base electrode 131a and the second base electrode 132a, disposed on the first to fourth surfaces S1 to S4 and facing each other in the first direction (the X direction), may be exposed from the first conductive layer 131b and the second conductive layer 132b, respectively.

That is, the first conductive layer 131b may be disposed on an edge of the first base electrode 131a, while the second conductive layer 132b may be disposed on an edge of the second base electrode 132a. As described above, the first and second conductive layers 131b and 132b cover respective edges of the first and second base electrodes 131a and 132a, and may thus compensate for each edge, a weak point of the multilayer ceramic electronic component 100.

As described above, the first base electrode 131a and the second base electrode 132a extend and are disposed on the first to fourth surfaces S1 to S4 of the ceramic body 110. In this case, if the first base electrode 131a and the second base electrode 132a are placed significantly close to each other, short of a component may occur. Thus, the first base electrode 131a and the second base electrode 132a may be spaced apart from each other. A separation distance between the first base electrode 131a and the second base electrode 132a is not particularly limited. For example, the first base electrode and the second base electrode may be spaced apart from each other by a distance 1/20 times or more and less than a length of the ceramic body 110.

According to an embodiment of the present disclosure, when the ceramic body 110 is viewed in the first direction (the X direction), ends of the first and second conductive layers 131b and 132b are disposed on the capacitance forming portions $\alpha_W$ and $\alpha_T$. Here, ends of the first and second conductive layers 131b and 132b are disposed on the capacitance forming portions $\alpha_W$ and $\alpha_T$. This refers to a structure in which ends of the first and second conductive layers 131b and 132b are disposed in a region in which the internal electrodes 121 and 122 are disposed, assuming that first and second base electrodes 131a and 132a are not provided. For example, the first and second conductive layers 131b and 132b may overlap with the capacitance forming portions $\alpha_W$ and $\alpha_T$, or one or more internal electrodes, in the first direction (the X direction).

Figure 5:
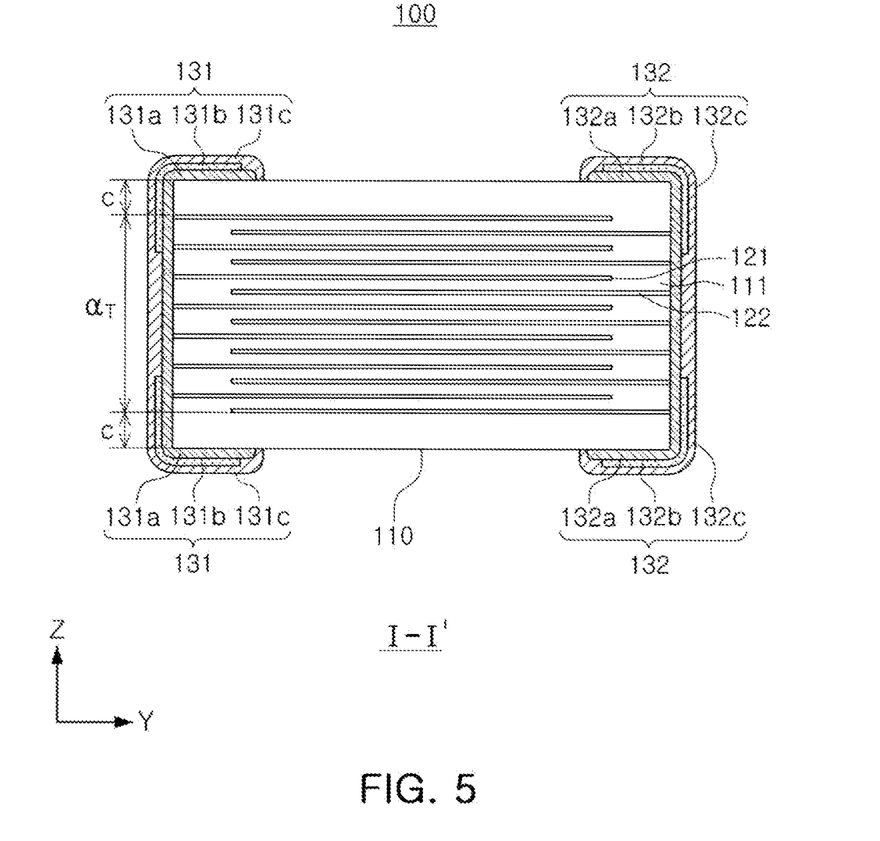
FIG. 5 is a cross-sectional view taken along line I-I' of FIG. 1.

Referring to FIG. 5, in an embodiment, ends of the first and second conductive layers 131b and 132b may be disposed over a region of the cover portions c in a region of the capacitance forming portions $\alpha_W$ and $\alpha_T$. When moisture penetrates into the multilayer ceramic electronic component 100, in consideration of a structure of the multilayer ceramic electronic component 100, a gap between the capacitance forming portions $\alpha_W$ and $\alpha_T$ and the cover portions c may be the weakest point. In this regard, because of difference in sintering shrinkage of the dielectric layer 111 and the internal electrodes 121 and 122, a point, at which an internal electrode in an outermost portion and the cover portion c meet, becomes a point with the weakest mechanical strength. In the multilayer ceramic electronic component 100 according to an embodiment, the first conductive layer 131b and the second conductive layer 132b are disposed on edges of the first and second base electrodes 131a and 132a, respectively, while covering ends of the capacitance forming portions $\alpha_W$ and $\alpha_T$. Thus, corner coverage of a point at which the capacitance forming portions $\alpha_W$ and $\alpha_T$ and the cover portion c meet may be improved, and thus a moisture penetration path may be blocked in advance.

The first terminal electrode 131c and the second terminal electrode 132c of the multilayer ceramic electronic component 100 according to an embodiment of the present disclosure may cover the first conductive layer 131b and the second conductive layer 132b, respectively. In this specification, terminal electrodes 131c and 132c cover conductive layers 131b and 132b. This refers to terminal electrodes 131c and 132c disposed so as not to expose the conductive layers 131b and 132b externally. In detail, the first conductive layer 131b and the second conductive layer 132b are disposed in the first external electrode 131 and the second external electrode 132, respectively. Here, when viewed from the outside, only the first terminal electrode 131c and the second terminal electrode 132c are seen.

In an embodiment of the present disclosure, a region in which the first and second base electrodes 131a and 132a and the first and second terminal electrodes 131c and 132c are in contact with each other in the first direction (the X direction) of the ceramic body 110 of the multilayer ceramic electronic component 100 may be included in an end surface of the capacitance forming portions $\alpha_W$ and $\alpha_T$ in the second direction (the Y direction) and the third direction (the Z direction). Here, the region in which the first and second base electrodes 131a and 132a and the first and second terminal electrodes 131c and 132c are in contact with each other in the first direction (the X direction) of the ceramic body 110 may be included in an end surface of the capacitance forming portions $\alpha_W$ and $\alpha_T$ in the second direction (the Y direction) and the third direction (the Z direction). This refers to, when the ceramic body 110 is viewed in the first direction (the X direction), a size of the region in which the first and second base electrodes 131a and 132a and the first and second terminal electrodes 131c and 132c are in contact with each other smaller than a size of an end surface of the capacitance forming portions $\alpha_W$ and $\alpha_T$ in the second direction (the Y direction) and the third direction (the Z direction). In an embodiment, the first and second base electrodes 131a and 132a are disposed on the ceramic body 110, the first conductive layer 131b and the second conductive layer 132b are disposed on edges of the first and second base electrodes 131a and 132a, the first base electrode 131a and the first conductive layer 131b are covered by the first terminal electrode 131c, and the second base electrode 132a and the second conductive layer 132b are covered by the second terminal electrode 132c. Thus, while moisture resistance reliability is improved, electrical conductivity is maintained, so performance of the multilayer ceramic electronic component 100 may be maintained.

Figure 1:
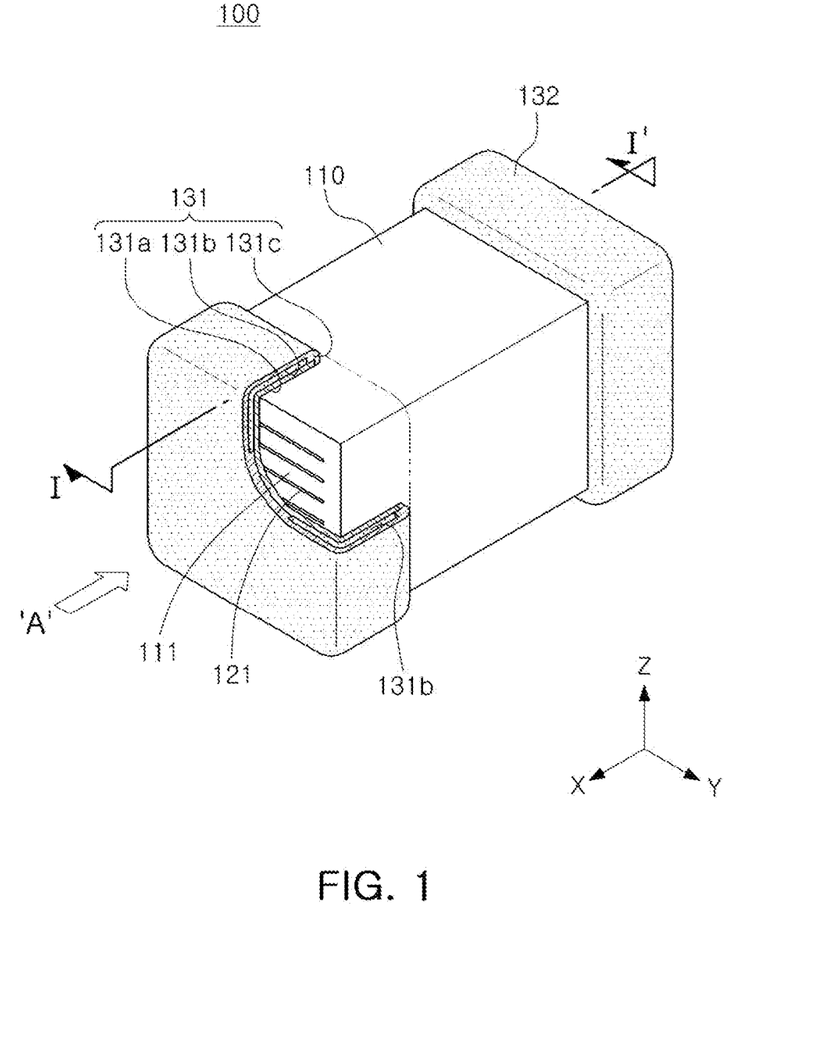
FIG. 1 is a schematic perspective view illustrating a multilayer ceramic electronic component according to an embodiment.
Figure 2:
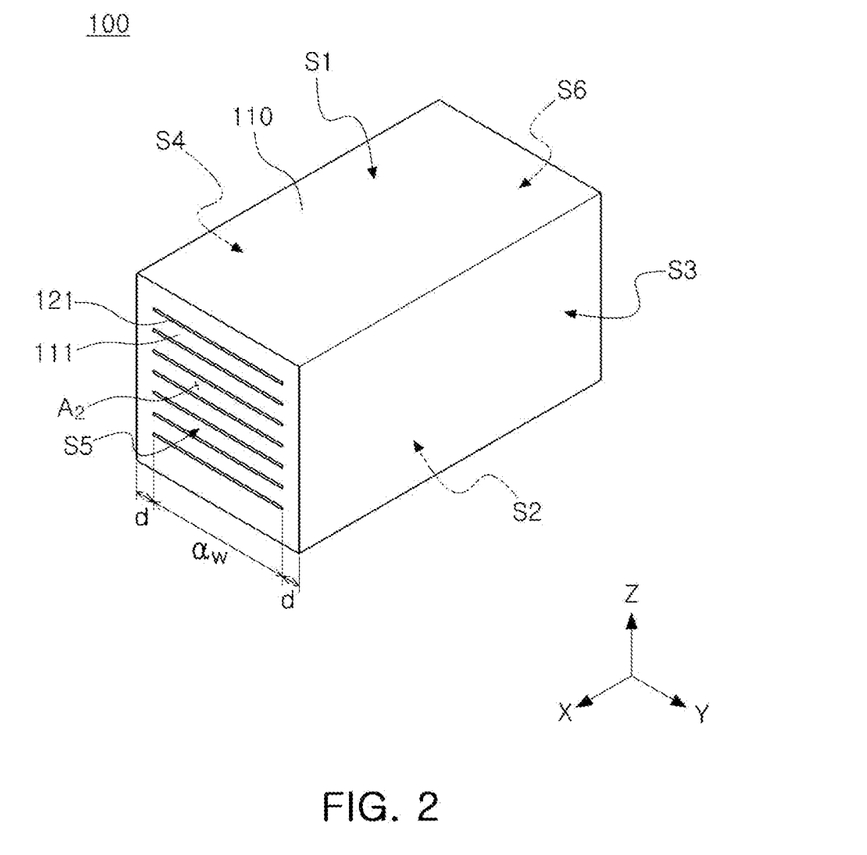
FIG. 2 is a schematic perspective view illustrating a multilayer ceramic electronic component according to an embodiment.
Figure 3:
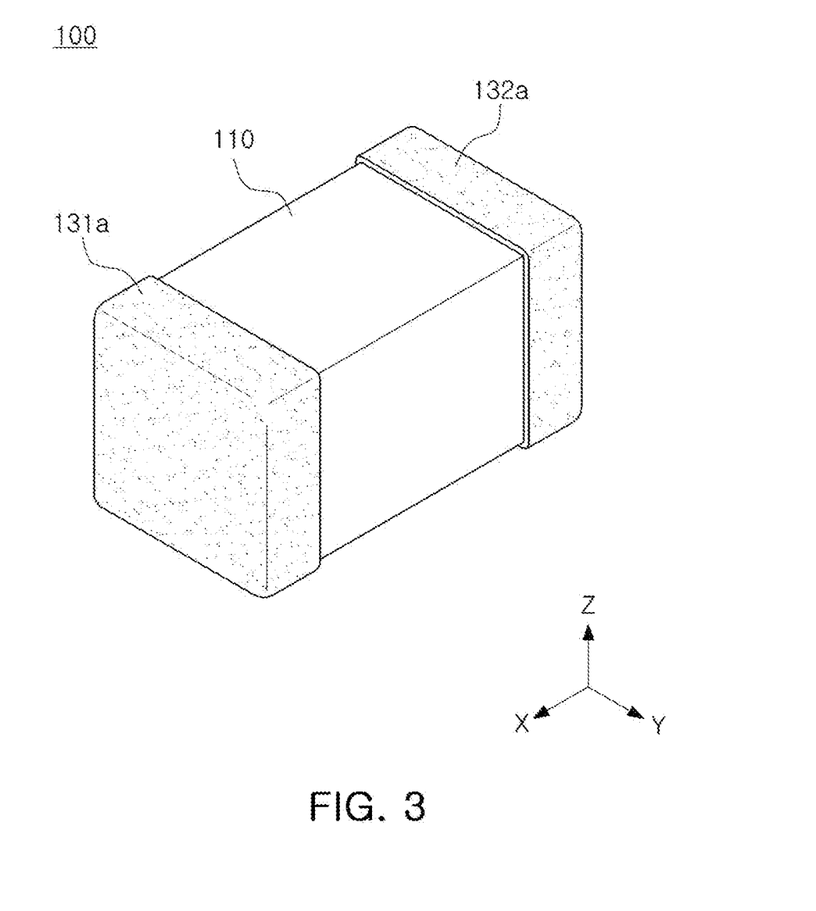
FIG. 3 is a schematic perspective view illustrating a structure of arrangement of a base electrode on a ceramic body according to an embodiment.
Figure 6:
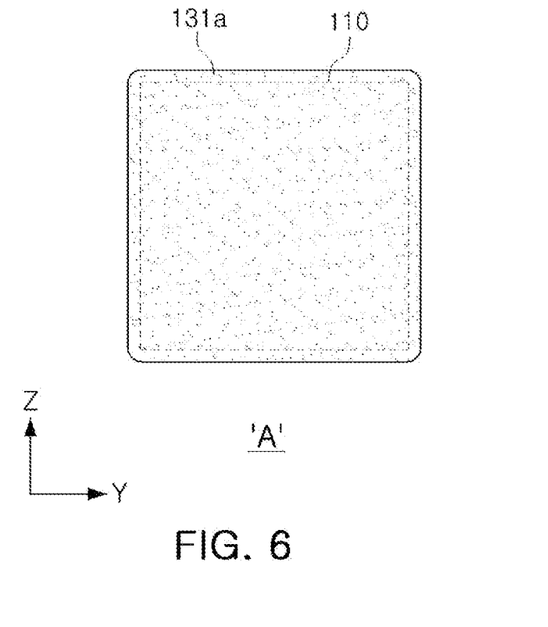
FIGS. 6 to 8 are views of a multilayer ceramic electronic component according to an embodiment viewed in direction A.
Figure 7:
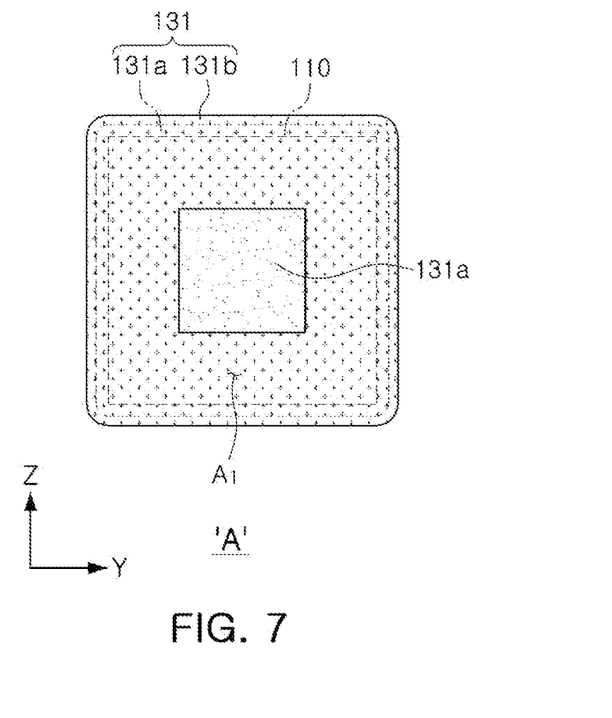
Figure 8:
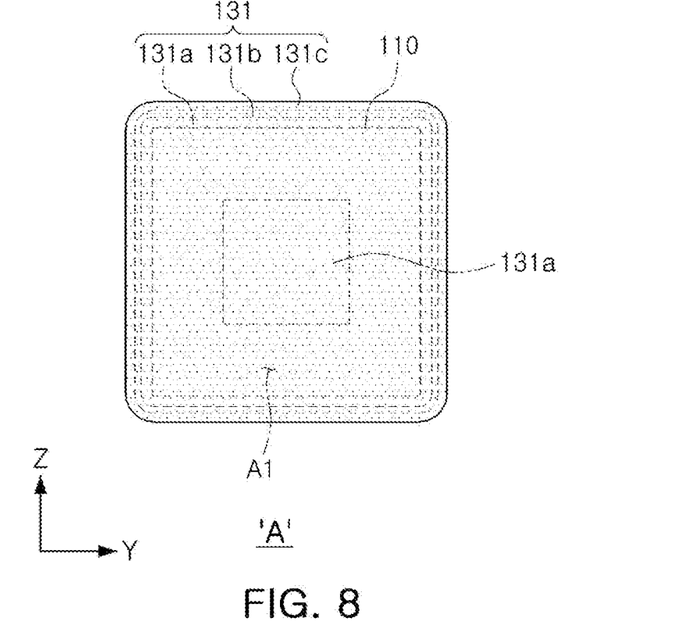

FIGS. 6 to 8 are schematic views of the multilayer ceramic electronic component 100 of FIG. 1 viewed in direction A. Referring to FIGS. 6 to 8, in an embodiment of the present disclosure, regions of first and second base electrodes 131a and 132a on which first and second conductive layers 131b and 132b are not formed have a quadrangular shape in the first direction of the ceramic body 110. When the regions of first and second base electrodes 131a and 132a on which first and second conductive layers 131b and 132b are not formed have a quadrangular shape, an area of corner coverage of an external electrode is uniform, so a plating solution penetration prevention effect may be more excellent.

Figure 9:
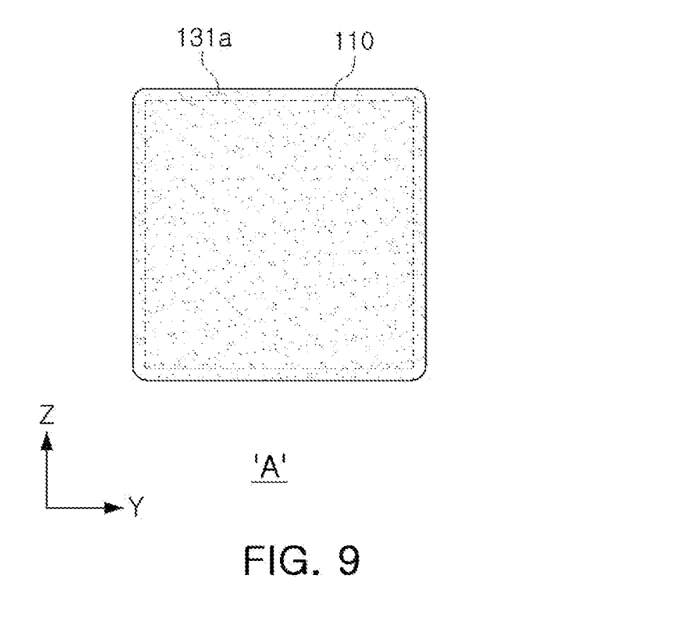
FIGS. 9 to 11 are views of a multilayer ceramic electronic component according to another embodiment viewed in direction A.
Figure 10:
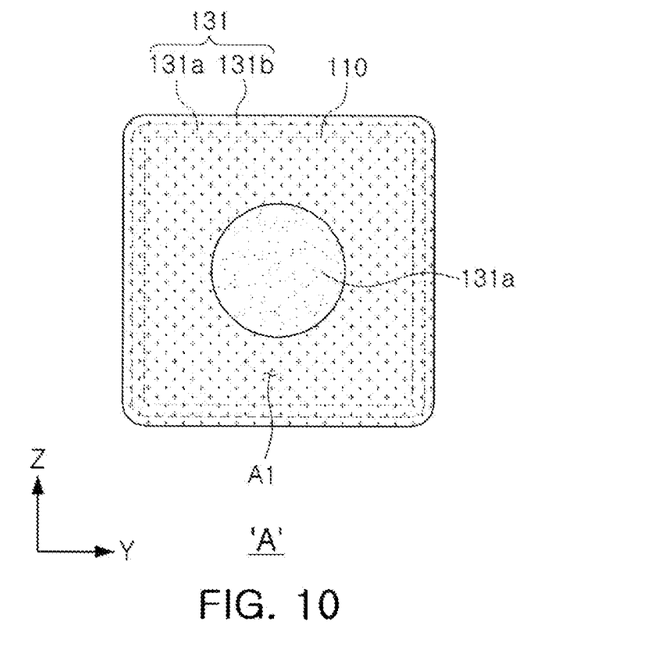
Figure 11:
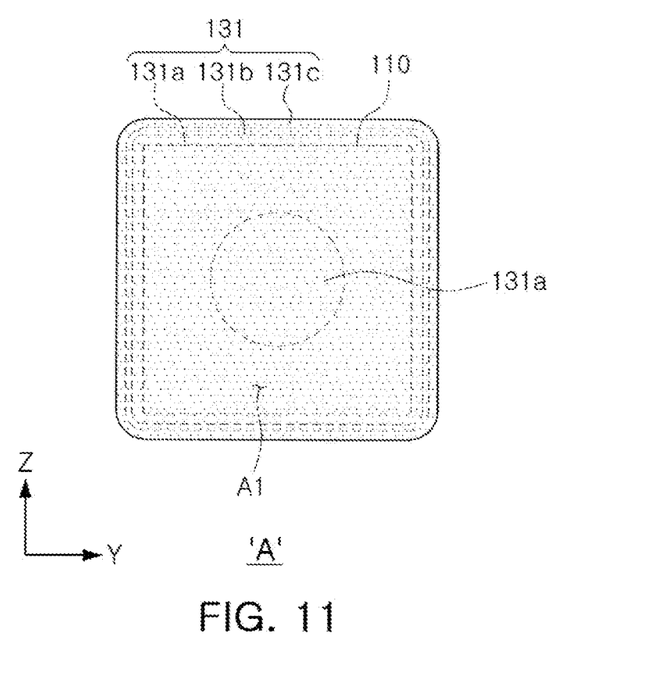

Meanwhile, referring to FIGS. 9 to 11, in a multilayer ceramic electronic component 100 according to another embodiment of the present disclosure, regions of first and second base electrodes 131a and 132a on which first and second conductive layers 131b and 132b are not formed have a circular shape in the first direction (the X direction) of the ceramic body 110. When the regions of first and second base electrodes 131a and 132a on which first and second conductive layers 131b and 132b are not formed have a circular shape, a moisture penetration path is further reduced, so a plating solution penetration prevention effect may be excellent.

In an example of the present disclosure, a first conductive layer 131b, a second conductive layer 132b, a first base electrode 131a, and a second base electrode 132a of the multilayer ceramic electronic component 100 according to an embodiment of the present disclosure may include the same conductive metal. As in an example, when the first conductive layer 131b, the second conductive layer 132b, the first base electrode 131a, and the second base electrode 132a include the same conductive metal, adhesion between the conductive layers 131b and 132b and the base electrodes 131a and 132a is improved, so external moisture could be prevented more effectively from being penetrated.

In another example of the present disclosure, the first conductive layer 131b, the second conductive layer 132b, the first base electrode 131a, and the second base electrode 132a include conductive metals, and an average particle diameter of conductive metals included in the first and second base electrodes 131a and 132a may be smaller than an average particle diameter of conductive metals included in the first and second conductive layers 131b and 132b. The average particle diameter of the conductive metals may refer to a diameter of D50, and may be a value measured using a particle size analyzer such as SALD-7101, available from Shimadzu Corporation. When the average particle diameter of conductive metals included in the first and second conductive layers 131b and 132b is greater than the average particle diameter of conductive metals included in the first and second base electrodes 131a and 132a, the first base electrode 131a and the second base electrode 132a, disposed on edges of the ceramic body 110, have a denser structure, so moisture penetration preventing performance may be further improved. Moreover, compactness between the first and second conductive layers 131b and 132b and the first and second base electrodes 131a and 132a is increased, so moisture resistance reliability may be further improved.

In an embodiment of the present disclosure, a first conductive layer 131b, a second conductive layer 132b, a first base electrode 131a, and a second base electrode 132a may include copper (Cu). The first conductive layer 131b, the second conductive layer 132b, the first base electrode 131a, and the second base electrode 132a may contain the largest amount of copper (Cu), but an embodiment is not limited thereto. For example, the first conductive layer, the second conductive layer, the first base electrode, and the second base electrode may be formed using a conductive paste including at least one material among nickel (Ni), tin (Sn), palladium (Pd), platinum (Pt), gold (Au), silver (Ag), tungsten (W), titanium (Ti), lead (Pb), and an alloy thereof, as well as glass.

A method for forming the first conductive layer 131b, the second conductive layer 132b, the first base electrode 131a, and the second base electrode 132a is not particularly limited. For example, the first conductive layer, the second conductive layer, the first base electrode, and the second base electrode may be formed by dipping a ceramic body in a conductive paste including a conductive metal and glass, printing the conductive paste on a surface of a ceramic body using screen printing or gravure printing, applying the conductive paste to a surface of a ceramic body, or transferring a dried film with a dried conductive paste on a ceramic body, but an embodiment is not limited thereto. The first conductive layer 131b, the second conductive layer 132b, the first base electrode 131a, and the second base electrode 132a are formed of the conductive paste described above. Thus, while sufficient conductivity is maintained, compactness of an external electrode is increased due to added glass, so penetration of a plating solution and/or external moisture may be effectively suppressed.

A glass component, included in the first conductive layer 131b, the second conductive layer 132b, the first base electrode 131a, and the second base electrode 132a, may be a mixture of oxides. It is not particularly limited, and the glass component may be one or more selected from the group consisting of silicon oxide, boron oxide, aluminum oxide, transition metal oxide, alkali metal oxide, and alkaline earth metal oxide. The transition metal may be selected from the group consisting of zinc (Zn), titanium (Ti), copper (Cu), vanadium (V), manganese (Mn), iron (Fe), and nickel (Ni), the alkali metal may be selected from the group consisting of lithium (Li), sodium (Na), and potassium (K), and the alkaline earth metal may be one or more selected from the group consisting of magnesium (Mg), calcium (Ca), strontium (Sr), and barium (Ba).

In one example, the first and second terminal electrodes 131c and 132c may be formed by plating. The first and second terminal electrodes 131c and 132c may be formed using sputtering or electrolytic plating such as electric deposition, but an embodiment is not limited thereto.

The first and second terminal electrodes 131c and 132c may contain a largest amount of nickel (Ni), but an embodiment is not limited thereto. Alternatively, the first and second terminal electrodes may include one of nickel (Ni), copper (Cu), tin (Sn), palladium (Pd), platinum (Pt), gold (Au), silver (Ag), tungsten (W), titanium (Ti), or lead (Pb), or an alloy thereof. The plating layer is included, so mountability on a substrate, structural reliability, durability to an outside, heat resistance, and/or equivalent series resistance (ESR) may be improved.

In Table 1, thicknesses of an external electrode in an edge of a ceramic body according to whether first and second conductive layers are applied, and a ratio of an area of first and second conductive layers to an area of an end surface of a ceramic body are illustrated.

TABLE 1

| Classification | Whether conductive layer is placed | Ratio (%) of area of conductive layer | Thickness (μm) of external electrode disposed on edge | Thickness (μm) of external electrode |
|---|---|---|---|---|
| Comparative Example 1 | No | 0 | 7 | 290 |
| Example 1 | Yes | 10 | 15 | 296 |
| Example 2 |  | 20 | 22 | 299 |

TABLE 1-continued

| Classification | Whether conductive layer is placed | Ratio (%) of area of conductive layer | Thickness (μm) of external electrode disposed on edge | Thickness (μm) of external electrode |
|---|---|---|---|---|
| Example 3 | | 30 | 25 | 323 |
| Comparative Example 2 | | 40 | 26 | 380 |

As illustrated in Table 1, compared with Comparative Example 1 in which first and second conductive layers are not disposed, in Examples 1 to 3, while a thickness of an external electrode is not significantly affected, a thickness of an external electrode disposed on an edge is formed to be relatively great. In addition, if an area of a conductive layer exceeds 30%, an overall thickness of an external electrode is significantly increased, so it is difficult to miniaturize a component.

As set forth above, according to an embodiment in the present disclosure, a multilayer ceramic electronic component capable of improving corner coverage performance of an external electrode may be provided.

According to another embodiment in the present disclosure, a multilayer ceramic electronic component with improved moisture resistance reliability may be provided.

According to still another embodiment in the present disclosure, a multilayer ceramic electronic component capable of blocking a moisture penetration path, and allowing a band portion of an external electrode to be thin may be provided.

While exemplary embodiments have been shown and described above, it will be apparent to those skilled in the art that modifications and variations could be made without departing from the scope of the present invention as defined by the appended claims.

What is claimed is:

1. A multilayer ceramic electronic component, comprising:
 a ceramic body having fifth and sixth surfaces opposing each other in a first direction, third and fourth surfaces opposing each other in a second direction, first and second surfaces opposing each other in a third direction, the ceramic body including:
 a capacitance forming portion including a dielectric layer and first and second internal electrodes disposed with the dielectric layer interposed therebetween to be stacked in the third direction,
 margin portions disposed on both sides of the capacitance forming portion in the second direction, and
 cover portions disposed on both sides of the capacitance forming portion in the third direction; and
 first and second external electrodes disposed on the fifth surface and the sixth surface of the ceramic body, respectively,
 wherein the first and second external electrodes include first and second base electrodes disposed on the fifth surface and the sixth surface of the ceramic body, respectively, a first conductive layer disposed on edges of the first base electrode and extending toward a central portion of the fifth surface, so as to cover uppermost and lowermost first internal electrodes in the third direction among the first internal electrodes, and a second conductive layer disposed on edges of the second base electrode and extending toward a central portion of the sixth surface, so as to cover uppermost and lowermost second internal electrodes in the third direction among the second internal electrodes, and first and second terminal electrodes covering the first and second base electrodes and the first and second conductive layers, respectively, and
 wherein the first and second base electrodes are in direct contact with the first and second terminal electrodes on the fifth and sixth surfaces, respectively.

2. The multilayer ceramic electronic component of claim 1, wherein the first conductive layer is disposed on the first base electrode, disposed on the fifth surface of the ceramic body, and the first conductive layer extends onto an extending portion of the first base electrode extending on the first surface to the fourth surface, in contact with the fifth surface, and
 the second conductive layer is disposed on the second base electrode, disposed on the sixth surface of the ceramic body, and the second conductive layer extends onto an extending portion of the second base electrode extending on the first surface to the fourth surface, in contact with the sixth surface.

3. The multilayer ceramic electronic component of claim 2, wherein end portions of the extending portions of the first base electrode and the second base electrode, disposed on the first to fourth surfaces and facing each other in the first direction, are in contact with the first and second terminal electrodes, respectively.

4. The multilayer ceramic electronic component of claim 1, wherein, when the ceramic body is viewed in the first direction, ends of the first and second conductive layers are disposed on the capacitance forming portion.

5. The multilayer ceramic electronic component of claim 1, wherein the first and second conductive layers have a quadrangular-shaped opening on the first and second base electrodes in the first direction, respectively.

6. The multilayer ceramic electronic component of claim 1, wherein the first and second conductive layers have a circular-shaped opening on the first and second base electrodes in the first direction, respectively.

7. The multilayer ceramic electronic component of claim 1, wherein the first conductive layer, the second conductive layer, the first base electrode, and the second base electrode include the same conductive metal.

8. The multilayer ceramic electronic component of claim 1, wherein an average particle diameter of conductive metals included in the first and second base electrodes is smaller than an average particle diameter of conductive metals included in the first and second conductive layers.

9. The multilayer ceramic electronic component of claim 1, wherein the first conductive layer, the second conductive layer, the first base electrode, and the second base electrode include copper.

10. The multilayer ceramic electronic component of claim 1, wherein the first base electrode, the second base electrode, the first conductive layer, and the second conductive layer include a conductive metal and glass.

* * * * *